(12) United States Patent
Balani et al.

(10) Patent No.: US 9,069,677 B2
(45) Date of Patent: Jun. 30, 2015

(54) INPUT/OUTPUT DE-DUPLICATION BASED ON VARIABLE-SIZE CHUNKS

(71) Applicant: International Business Machines Corporation, Armonk, NY (US)

(72) Inventors: Rahul Balani, Bangalore (IN); Sujesha Sudevalayam, Bangalore (IN); Akshat Verma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 13/872,444

(22) Filed: Apr. 29, 2013

(65) Prior Publication Data

US 2014/0325142 A1 Oct. 30, 2014

(51) Int. Cl.
*G06F 12/00* (2006.01)
*G06F 12/08* (2006.01)
*G06F 3/06* (2006.01)
*G06F 17/30* (2006.01)

(52) U.S. Cl.
CPC .......... *G06F 12/0866* (2013.01); *G06F 3/0641* (2013.01); *G06F 17/30156* (2013.01)

(58) Field of Classification Search
CPC .......... G06F 12/0866; G06F 17/30156; G06F 3/0641
See application file for complete search history.

(56) References Cited

U.S. PATENT DOCUMENTS

| | | | |
|---|---|---|---|
| 7,600,125 | B1 | 10/2009 | Stringham |
| 7,949,662 | B2 | 5/2011 | Farber et al. |
| 2008/0209132 | A1* | 8/2008 | Chen .............................. 711/141 |
| 2009/0171888 | A1* | 7/2009 | Anglin .............................. 707/2 |
| 2011/0145534 | A1 | 6/2011 | Factor et al. |
| 2012/0030477 | A1 | 2/2012 | Lu et al. |
| 2012/0078858 | A1 | 3/2012 | Nagpal et al. |
| 2012/0084414 | A1 | 4/2012 | Brock et al. |
| 2012/0124046 | A1 | 5/2012 | Provenzano |
| 2012/0124282 | A1 | 5/2012 | Frank et al. |
| 2012/0131025 | A1 | 5/2012 | Cheung et al. |
| 2012/0136841 | A1 | 5/2012 | Ambat et al. |
| 2012/0137054 | A1 | 5/2012 | Sadri et al. |
| 2012/0150823 | A1 | 6/2012 | Tofano |
| 2012/0158670 | A1 | 6/2012 | Sharma et al. |
| 2012/0185448 | A1 | 7/2012 | Mensch et al. |

(Continued)

OTHER PUBLICATIONS

Koller et al., I/O Deduplication: Utilizing Content Similarity to Improve I/O Performance. USENIX FAST. Feb. 2010; ACM Transactions on Storage, 6(3), Sep. 2010.

(Continued)

*Primary Examiner* — John Lane
(74) *Attorney, Agent, or Firm* — Ryan, Mason & Lewis, LLP (57) ABSTRACT

Techniques, systems, and articles of manufacture for input/output de-duplication based on variable-size chunks. A method includes partitioning virtual block data into multiple variable-sized chunks, caching each of the multiple variable-sized chunks in a chunk cache according to content of each of the multiple variable-sized chunks, initializing virtual block-to-chunk mapping and chunk-to-physical block mapping for each of the multiple variable-sized chunks, and detecting duplicate disk input and/or output requests across multiple hosts based on content-based mappings of the input and/or output requests to the chunk cache and the virtual block-to-chunk mapping and chunk-to-physical block mapping for each of the multiple variable-sized chunks in the chunk cache.

19 Claims, 5 Drawing Sheets

(56) References Cited

U.S. PATENT DOCUMENTS

| | | | |
|---|---|---|---|
| 2012/0198168 A1 | 8/2012 | Abdallah | |
| 2012/0304171 A1 | 11/2012 | Joshi et al. | |
| 2013/0091102 A1* | 4/2013 | Nayak | 707/692 |
| 2014/0050407 A1* | 2/2014 | Chen et al. | 382/195 |
| 2014/0189268 A1* | 7/2014 | Baldwin et al. | 711/160 |
| 2014/0310476 A1* | 10/2014 | Kruus et al. | 711/133 |
| 2014/0325142 A1* | 10/2014 | Balani et al. | 711/113 |

OTHER PUBLICATIONS

Mudrankit, A Context Aware Block Layer: The Case for Block Layer Deduplication. May 2012.

Ungureanu et al. Hydra FS: a High-Throughput File System for the HYDR Astor Content-Addressable Storage System. FAST'10 Proceedings of the 8th USENIX conference on File and Storage Technologies, 2010.

Muthitacharoen et al. A Low-Bandwidth Network File System, SOSP 2001.

Meyer et al., A Study of Practical Deduplication, FAST 2011.

Han et al., RPT: Re-architecting Loss Protection for Content-Aware Networks, Jun. 2011.

Gupta et al., Difference Engine: Harnessing Memory Redundancy in Virtual Machines, Communications of the ACM. Oct. 2010.

Milos et al. Satori: Enlightened Page Sharing. USENIX 2009.

Clements et al. Decentralized Deduplication in SAN Cluster File Systems, USENIX 2009.

Rabin, Fingerprinting by Random Polynomials. Center for Research in Computing Technology Harvard University Report TR-15-81 (1981).

Broder, Some Applications of Rabin's Fingerprinting Method. In Sequences II: Methods in Communications, Security, and Computer Science, pp. 143-152. Springer-Verlag, 1993.

Peng et al. VDN: Virtual Machine Image Distribution Network for Cloud Data Centers. Proceedings of INFOCOM 2012.

Jayaram et al. An Empirical Analysis of Similarity in Virtual Machine Images, Proceedings of the Middleware 2011 Industry Track Workshop.

Jin et al. The Effectiveness of Deduplication on Virtual Machine Disk Images. Proceedings of SYSTOR 2009.

Morrey et al. Content-Based Block Caching. Proceedings of MSST 2006.

Liguori et al. Experiences with Content Addressable Storage and Virtual Disks. Proceedings of the Workshop on I/O Virtualization 2008.

* cited by examiner

INPUT/OUTPUT DE-DUPLICATION BASED ON VARIABLE-SIZE CHUNKS

FIELD OF THE INVENTION

Embodiments of the invention generally relate to information technology, and, more particularly, to disk performance.

BACKGROUND

In virtualization environments, many virtual machine (VM) images have similar operating systems, application and/or library installations and development environments. Harnessing the similarity can help avoid duplicate work carried out for disk input/output (I/O) requests that repeatedly fetch the same content. For example, I/O de-duplication by identifying duplicate content across fixed-size blocks within the same VM has been shown to improve disk performance. However, variable-size chunks often assist in identifying more similarities across VM images than fixed-size blocks. Accordingly, a need exists to carry out de-duplication based on variable-sized blocks (also referred to herein as chunks) across multiple VMs such that change is minimally intrusive and has minimal performance impact.

SUMMARY

In one aspect of the present invention, techniques for input/output de-duplication based on variable-size chunks are provided. An exemplary computer-implemented method can include steps of partitioning virtual block data into multiple variable-sized chunks, caching each of the multiple variable-sized chunks in a chunk cache according to content of each of the multiple variable-sized chunks, initializing virtual block-to-chunk mapping and chunk-to-physical block mapping for each of the multiple variable-sized chunks, and detecting duplicate disk input and/or output requests across multiple hosts based on content-based mappings of the input and/or output requests to the chunk cache and the virtual block-to-chunk mapping and chunk-to-physical block mapping for each of the multiple variable-sized chunks in the chunk cache.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes techniques for performance improvement using input/output (I/O) de-duplication based on variable-size chunks to identify disk similarity across multiple hosts. As used herein, a "virtual block" refers to a block of data within a virtual machine image, and a "physical block" refers to the stored block on the physical disk. Additionally, in the context of mapping, a "virtual block-to-chunk mapping" refers to mapping from a virtual block's address to a chunk's identifier, along with corresponding offsets, based on the content of the virtual blocks and chunks. Similarly, a "chunk-to-physical block mapping" refers to mapping from a chunk identifier to a physical block's address, along with corresponding offsets, based on the content of the chunks and physical blocks. Also, as used herein, a "chunk" refers to a contiguous set of bytes of data, the boundaries of which are determined in a content-based manner and the size of which lies within a specified range [MINSIZE:MAXSIZE]. Any physical machine capable of hosting virtual machines is referred as a "host" herein.

At least one embodiment of the invention includes caching variable-size chunks at run-time to serve read and/or write requests at the block layer based on content similarity. Additionally, at least one embodiment of the invention includes maintaining virtual block-to-chunk-to-physical block maps based on content hashes, as well as generating a content-based cache and/or utility score-based cache replacement policy.

Figure 1:
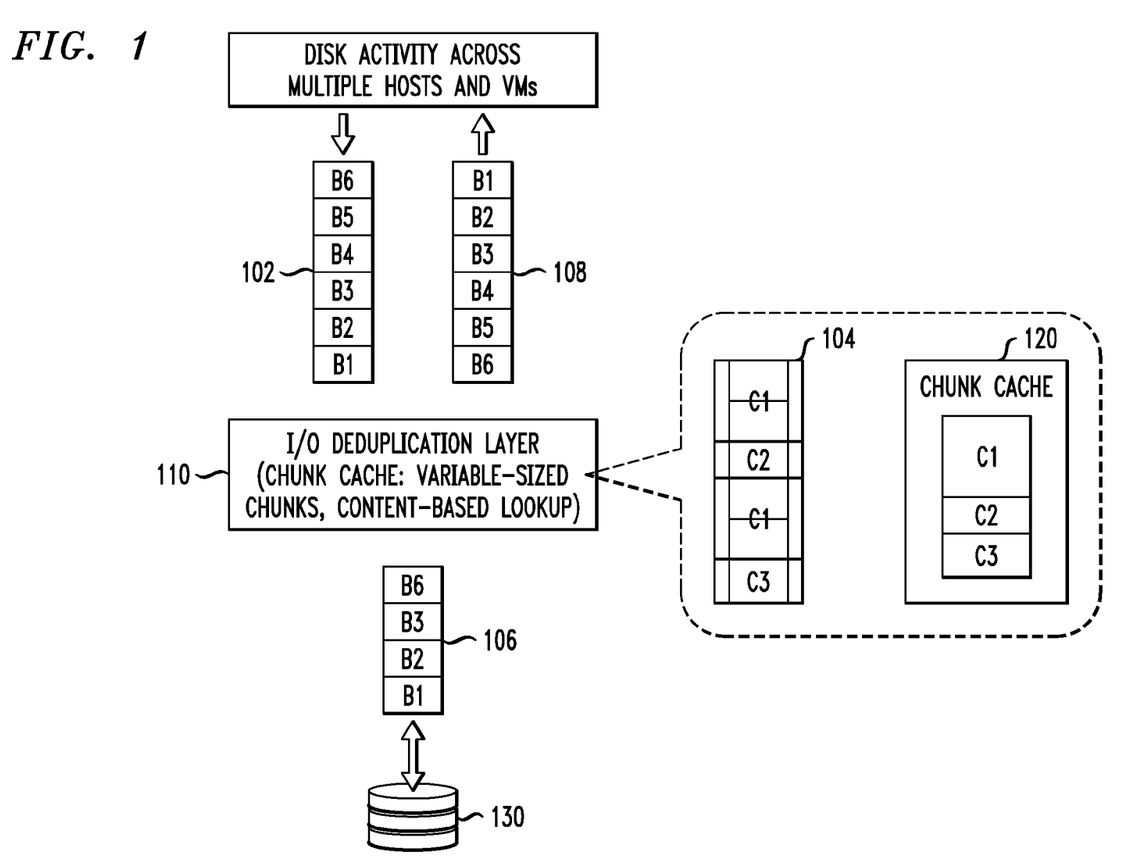
FIG. 1 is a block diagram illustrating an example embodiment, according to an aspect of the invention.

FIG. 1 is a block diagram illustrating an example embodiment, according to an aspect of the invention. By way of illustration, FIG. 1 depicts incoming block requests 102 (as derived from disk activity across multiple hosts and VMs) which are provided to an I/O de-duplication layer component 110 (which includes a chunk cache 120 containing variable-sized chunks and content-based look-up capability). FIG. 1 also depicts content-based block-to-chunk mappings 104 which are used to detect duplicate I/O. The chunk cache 120 can be used for this detection so as to avoid extra disk fetches when duplicate content is being requested. In at least one embodiment of the invention, the I/O de-duplication layer component 110 can be implemented at a storage fabric layer to allow cross-host I/O redundancy elimination. Additionally, as further depicted in FIG. 1, after redundancy elimination is performed at the I/O de-duplication layer 110, requests for unique content 106 are requested to, and served by, a disk 130. Further, the I/O de-duplication layer component 110 outputs all requested content 108 by reconstructing the content from the retrieved content and the available mappings.

At least one embodiment of the invention includes the use of an algorithm for variable-sized chunking and for selection of boundary values to identify maximal similarity. Additionally, at least one embodiment of the invention includes mapping tables. As noted, virtual blocks and physical blocks are of fixed-size while chunks are of variable sizes in range. Thus, one virtual block can either map into one large chunk or can be composed of multiple smaller chunks.

By way of example, consider the following with respect to virtual-to-chunk mapping. Each virtual block (of a fixed size) can point to one or more chunks with non-sequential chunk identifiers (IDs), and each virtual block can start and end at arbitrary offsets within the first and last chunks, respectively. Information to be stored in such a scenario might include, for example, the starting chunk, an offset into the starting chunk, a list of remaining chunks (if any), and the last chunk and corresponding offset. For such a mapping scenario, rapid access at run-time is required.

Additionally, for example, consider the following with respect to chunk-to-physical mapping. A chunk can be of arbitrary size, and each chunk can correspond to one or more non-sequential physical blocks, and each chunk can start and end at arbitrary offsets within the first and last blocks, respectively.

Figure 2:
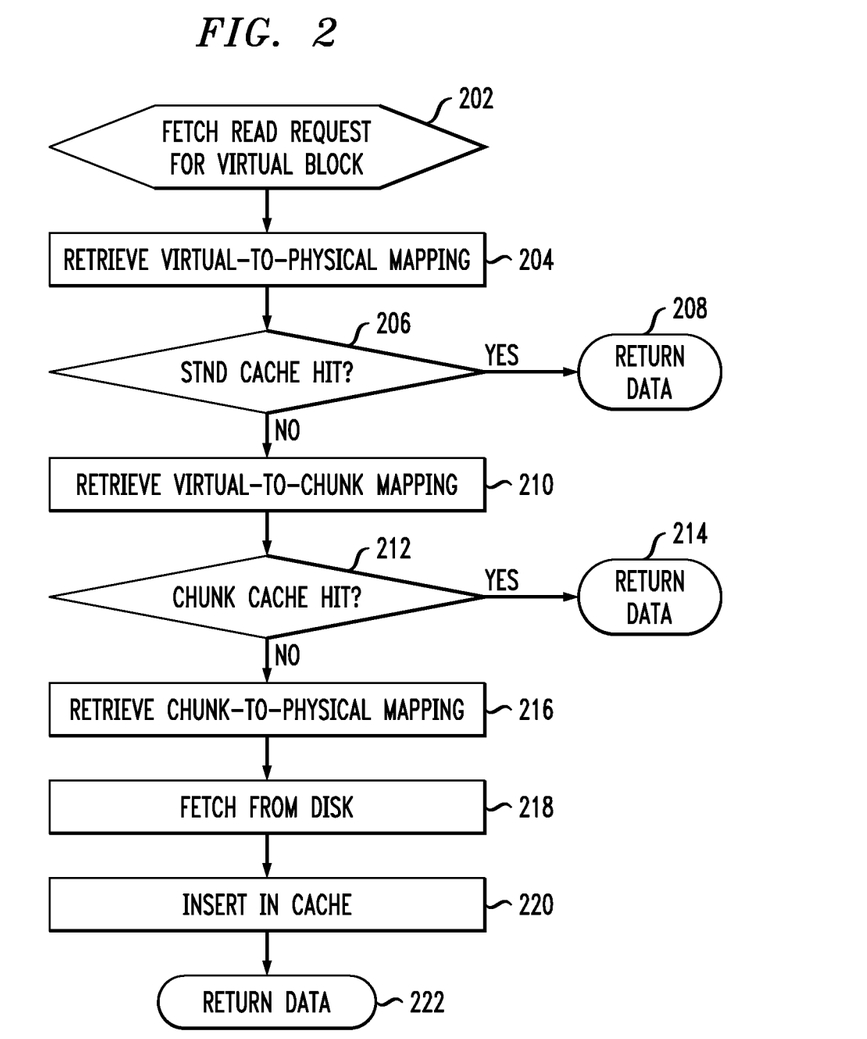
FIG. 2 is a flow diagram illustrating action upon a block read, according to an embodiment of the present invention.

FIG. 2 is a flow diagram illustrating action upon a block read, according to an embodiment of the present invention. Step 202 includes fetching a read request for a virtual block. Step 204 includes retrieving a virtual block-to-physical block mapping, and step 206 includes determining whether or not a standard cache hit is correspondingly incurred. If yes, return the corresponding data in step 208. If no (that is, a standard cache hit is not incurred), step 210 includes retrieving a virtual block-to-chunk mapping, and step 212 includes determining whether or not a chunk cache hit is correspondingly incurred. If yes, return the corresponding data in step 214. If no (that is, a chunk cache hit is not incurred), step 216 includes retrieving a chunk-to-physical block mapping. Step 218 includes fetching the corresponding physical block(s) from a disk, step 220 includes constructing the chunks from the fetched physical block(s) and inserting the chunk content into the chunk cache while also inserting the content of the physical block(s) into the standard cache. Further, step 222 includes returning the data.

Additionally, as detailed herein, when multiple virtual blocks contain similar data and map to different physical blocks, the selection of a physical block to fetch from a disk is carried out by at least one embodiment of the invention so as to achieve load balancing and/or a reduction in I/O seek time.

Figure 3:
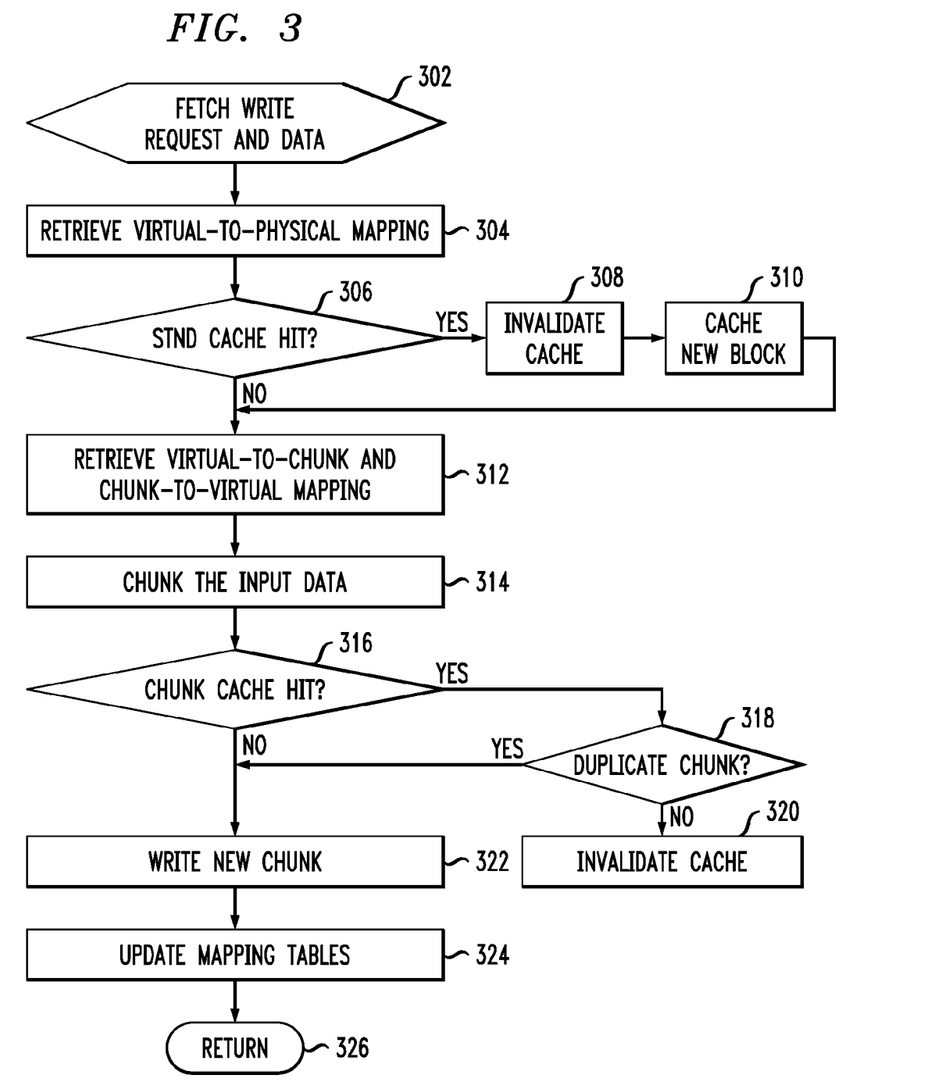
FIG. 3 is a flow diagram illustrating action upon a block write, according to an embodiment of the present invention.

FIG. 3 is a flow diagram illustrating action upon a block write, according to an embodiment of the present invention. Step 302 includes fetching a write request and associated input data that is required to be written onto the disk. Step 304 includes retrieving a virtual block-to-physical block mapping, and step 306 includes determining whether or not a standard cache hit is correspondingly incurred. If yes, invalidate the cache in step 308 and cache a new block (pertaining to the input data from the write request) in 310 (and continue to step 312). If no (that is, a standard cache hit is not incurred), step 312 includes retrieving a virtual block-to-chunk mapping and a chunk-to-physical block mapping. Step 314 includes chunking the input data (from the write request) using an algorithm (for example, the Rabin algorithm, described additionally herein) to break up the input data into variable-sized chunks based on the content of the input data, and step 316 includes determining whether or not a chunk cache hit is correspondingly incurred. If yes, a determination is made in step 318 whether or not the newly-composed chunk is a duplicate. If the chunk is not a duplicate, step 320 includes invalidating that chunk in the cache. There can be a plurality of such chunks, and at least one chunk per every write request.

If the chunk is a duplicate (or if no chunk cache hit is incurred in step 316), step 322 includes writing the new chunk content to cache. Further, step 324 includes updating the mapping tables, and step 326 includes returning control to the caller component (which issued the write request initially).

In at least one embodiment of the invention, a chunk cache replacement policy can include a parameter such as caching chunks with higher utility. Utility of a chunk may be defined as proportional to the amount of data that was actually requested, as opposed to extra data that was fetched from disk as part of that chunk. An additional parameter can include, for example, that every chunk cache hit increases the score of that chunk with a value proportional to the utility of that chunk, while the score is initialized to an initial utility when the chunk is first cached. Further, a to-be-evicted chunk can be chosen based on its score in conjunction with any other suitable caching replacement policy such as, for example, adaptive replacement cache (ARC) policy.

Figure 4:
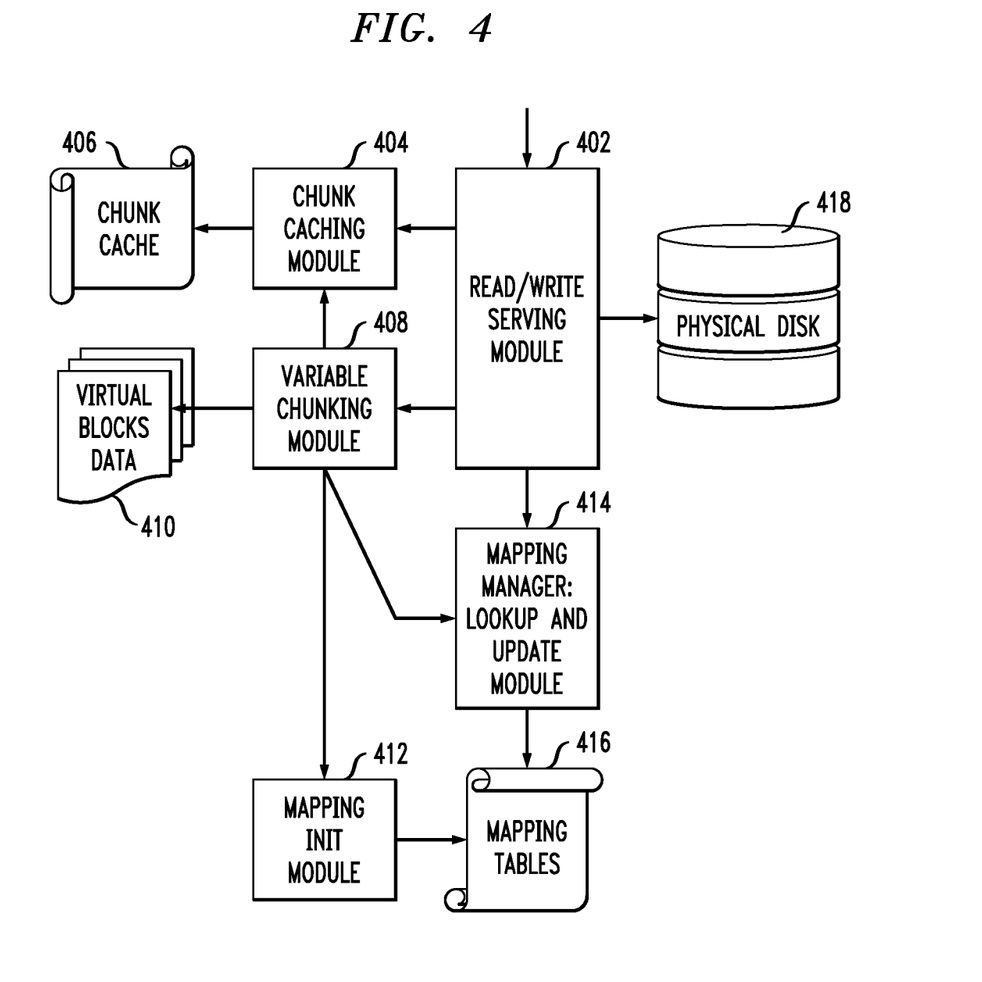
FIG. 4 is a block diagram illustrating an example embodiment, according to an aspect of the invention.

FIG. 4 is a block diagram illustrating an example embodiment, according to an aspect of the invention. By way of illustration, FIG. 4 depicts a read/write serving module 402, which receives a read/write request and interacts with a chunk caching module 404, a variable chunking module 408, a mapping manager component 414, and a physical disk 418. Additionally, as depicted in FIG. 4, the chunk caching module 404 interacts with a chunk cache 406, and the variable chunking module 408 interacts with virtual block data 410 and a mapping module 412. Further, mapping initialization ("init") module 412 and mapping manager component 414 interact with mapping tables 416.

The mapping tables 416 are initialized by the mapping module 412 by noting virtual-block-to-chunk and chunk-to-physical-block mappings after performing chunking of the virtual blocks data 410 via the variable chunking module 408. The read/write serving module 402 is responsible for looking-up mapping tables 416 via mapping manager 414 to determine which chunks correspond to the requested virtual block. For a read request, the read/write serving module 402 checks whether the chunk caching module 404 contains the desired chunk in the chunk cache 406, and fetches the data from physical disk 418 if it is not found in chunk cache. For a write request, the read/write serving module 402 invalidates the existing mappings of to-be-written virtual block, breaks up the input write data into variable-sized chunks via the variable chunking module 408 and updates mapping tables 416 with the new mappings.

Figure 5:
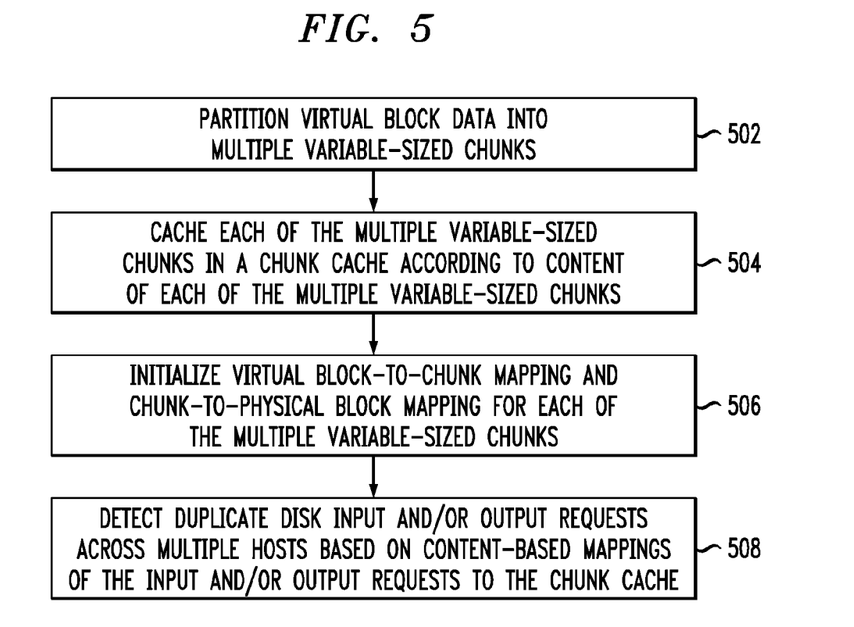
FIG. 5 is a flow diagram illustrating techniques according to an embodiment of the invention.

FIG. 5 is a flow diagram illustrating techniques according to an embodiment of the invention. Step 502 includes partitioning virtual block data into multiple variable-sized chunks. Each of the multiple variable-sized chunks can be of a size within the range of a pre-determined minimum size (MINSIZE) and a pre-determined maximum size (MAXSIZE).

Step 504 includes caching each of the multiple variable-sized chunks in a chunk cache according to content of each of the multiple variable-sized chunks. At least one embodiment of the invention includes assigning a score to each of the multiple variable-sized chunks in the chunk cache, wherein the score is based on demand and utility of the variable-sized chunk. Additionally, at least one embodiment of the invention includes denoting the variable-sized chunk with the lowest score in the cache as eligible for replacement. Also, an input/output de-duplication layer, including the chunk cache, can be implemented at a storage fabric layer.

Step 506 includes initializing virtual block-to-chunk mapping and chunk-to-physical block mapping for each of the multiple variable-sized chunks. Step 508 includes detecting duplicate disk input and/or output requests across multiple hosts based on content-based mappings of the input and/or output requests to the chunk cache, as well as the virtual block-to-chunk mapping and chunk-to-physical block mapping for each of the multiple variable-sized chunks in the chunk cache. In at least one embodiment of the invention, the content-based mappings of the input and/or output requests to the chunk cache are dynamically updated at run-time.

The techniques depicted in FIG. 5 can also include obtaining input comprising virtual-block data and virtual block-to-physical block mappings. Further, at least one embodiment of the invention includes identifying similarity across multiple disks using one or more of the multiple variable-sized chunks and one or more boundary values. As used herein, a boundary value refers to the content pattern that is sought in order to consider that a chunk boundary has been encountered. For example, in the Rabin chunking algorithm, a 13-bit hash of every 32-byte sequence is computed, and a chunk boundary is said to be encountered if the last few bits of the hash equals a certain boundary value, for example 0x000.

At least one embodiment of the invention can additionally include selecting a physical block to be fetched in response to an input and/or output request from a disk subsequent to a content-based mapping of the input and/or output requests to the chunk cache.

Additionally, at least one embodiment of the invention includes partitioning virtual block data into multiple variable-sized chunks, caching each of the multiple variable-sized chunks in a chunk cache according to content of each of the multiple variable-sized chunks, and mapping the virtual block data to physical block data, wherein said mapping comprises performing virtual block-to-chunk mapping and chunk-to-physical block mapping for each of the multiple variable-sized chunks in the chunk cache. Such an embodiment can also include processing an input and/or output request to detect a duplicate input and/or output request, wherein said processing comprises comparing a content-based mapping of the input and/or output request to the virtual block-to-chunk mapping and chunk-to-physical block mapping in the chunk cache to identify a corresponding one of the multiple variable-sized chunks in the chunk cache.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and configured to perform exemplary method steps.

Figure 6:
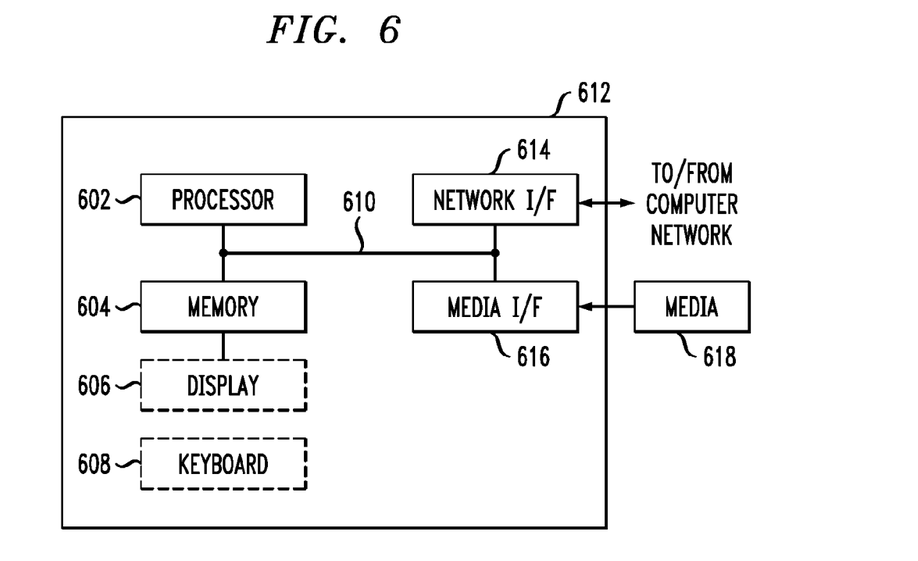
FIG. 6 is a system diagram of an exemplary computer system on which at least one embodiment of the invention can be implemented.

Additionally, an aspect of the present invention can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like)

can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, radio frequency (RF), etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, identifying disk and/or data similarity using variable-sized chunks The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   partitioning virtual block data into multiple variable-sized chunks;
   caching each of the multiple variable-sized chunks in a chunk cache according to content of each of the multiple variable-sized chunks;
   initializing virtual block-to-chunk mapping and chunk-to-physical block mapping for each of the multiple variable-sized chunks; and
   detecting duplicate disk input and/or output requests across multiple hosts based on (i) content-based mappings of the input and/or output requests to the chunk cache and (ii) the virtual block-to-chunk mapping and chunk-to-physical block mapping for each of the multiple variable-sized chunks in the chunk cache;
   wherein at least one of the steps is carried out by a computer device.

2. The method of claim 1, wherein each of the multiple variable-sized chunks comprises a size within the range of a pre-determined minimum size and a pre-determined maximum size.

3. The method of claim 1, comprising:
   assigning a score to each of the multiple variable-sized chunks in the chunk cache.

4. The method of claim 3, wherein the score is based on demand and utility of the variable-sized chunk.

5. The method of claim 3, comprising:
   denoting the variable-sized chunk with the lowest score in the cache as eligible for replacement.

6. The method of claim 1, wherein said content-based mappings of the input and/or output requests to the chunk cache are dynamically updated at run-time.

7. The method of claim 1, comprising:
   identifying similarity across multiple disks using one or more of the multiple variable-sized chunks and one or more boundary values.

8. The method of claim 1, comprising:
   implementing an input/output de-duplication layer at a storage fabric layer, wherein said input/output de-duplication layer comprises the chunk cache.

9. The method of claim 1, comprising:
   obtaining input comprising virtual-block data and virtual block-to-physical block mappings.

10. The method of claim 1, comprising:
    selecting a physical block to be fetched in response to an input and/or output request from a disk subsequent to content-based mapping of the input and/or output requests to the chunk cache.

11. An article of manufacture comprising a non-transitory computer readable storage medium having computer readable instructions tangibly embodied thereon which, when implemented, cause a computer to carry out a plurality of method steps comprising:
    partitioning virtual block data into multiple variable-sized chunks;
    caching each of the multiple variable-sized chunks in a chunk cache according to content of each of the multiple variable-sized chunks;
    initializing virtual block-to-chunk mapping and chunk-to-physical block mapping for each of the multiple variable-sized chunks; and
    detecting duplicate disk input and/or output requests across multiple hosts based on (i) content-based mappings of the input and/or output requests to the chunk cache and (ii) the virtual block-to-chunk mapping and chunk-to-physical block mapping for each of the multiple variable-sized chunks in the chunk cache.

12. The article of manufacture of claim 11, wherein each of the multiple variable-sized chunks comprises a size within the range of a pre-determined minimum size and a pre-determined maximum size.

13. The article of manufacture of claim 11, wherein the method steps comprise:
    assigning a score to each of the multiple variable-sized chunks in the chunk cache.

14. The article of manufacture of claim 13, wherein the score is based on demand and utility of the variable-sized chunk.

15. The article of manufacture of claim 13, wherein the method steps comprise:
    denoting the variable-sized chunk with the lowest score in the cache as eligible for replacement.

16. The article of manufacture of claim 11, wherein the method steps comprise:
    identifying similarity across multiple disks using one or more of the multiple variable-sized chunks and one or more boundary values.

17. The article of manufacture of claim 11, wherein the method steps comprise:

selecting a physical block to be fetched in response to an input and/or output request from a disk subsequent to content-based mapping of the input and/or output requests to the chunk cache.

18. A system comprising:

a memory; and at least one processor coupled to the memory and configured for:

partitioning virtual block data into multiple variable-sized chunks;

caching each of the multiple variable-sized chunks in a chunk cache according to content of each of the multiple variable-sized chunks;

initializing virtual block-to-chunk mapping and chunk-to-physical block mapping for each of the multiple variable-sized chunks; and detecting duplicate disk input and/or output requests across multiple hosts based on (i) content-based mappings of the input and/or output requests to the chunk cache and (ii) the virtual block-to-chunk mapping and chunk-to-physical block mapping for each of the multiple variable-sized chunks in the chunk cache.

19. A method comprising:

partitioning virtual block data into multiple variable-sized chunks;

caching each of the multiple variable-sized chunks in a chunk cache according to content of each of the multiple variable-sized chunks;

mapping the virtual block data to physical block data, wherein said mapping comprises performing virtual block-to-chunk mapping and chunk-to-physical block mapping for each of the multiple variable-sized chunks in the chunk cache; and processing an input and/or output request to detect a duplicate input and/or output request, wherein said processing comprises comparing a content-based mapping of the input and/or output request to the virtual block-to-chunk mapping and chunk-to-physical block mapping in the chunk cache to identify a corresponding one of the multiple variable-sized chunks in the chunk cache;

wherein at least one of the steps is carried out by a computer device.

* * * * *